July 26, 1949.  J. E. LAWSON  2,476,984
TURN-ABOUT COASTER
Filed Sept. 17, 1946
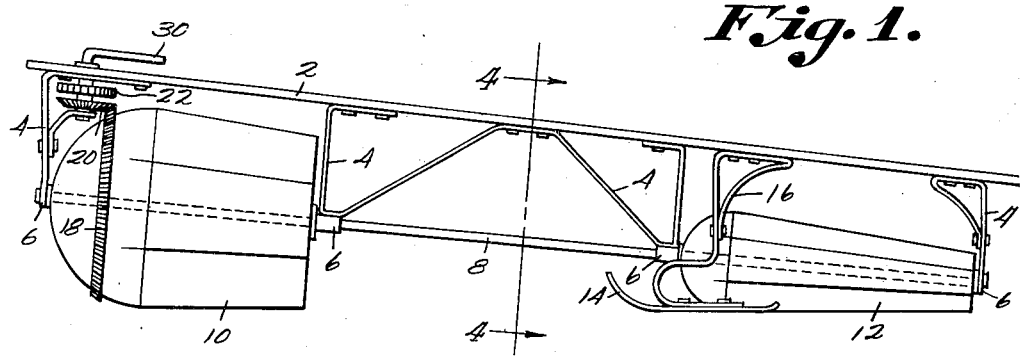
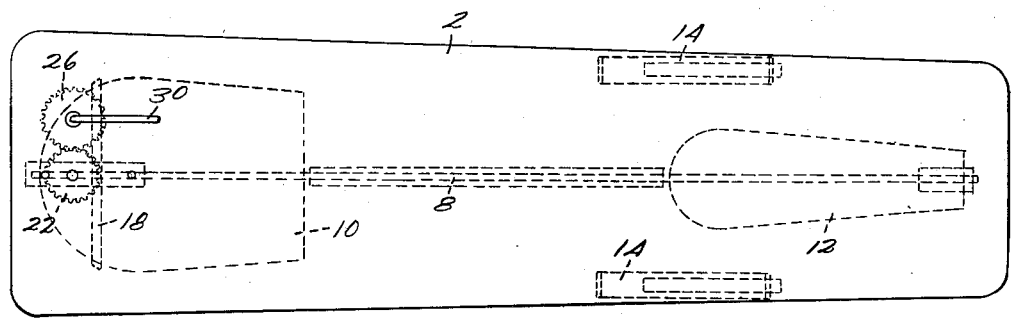
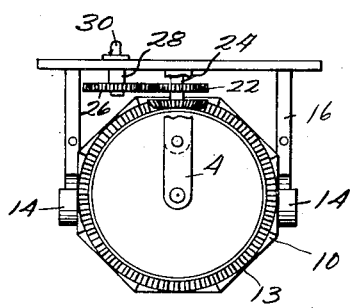
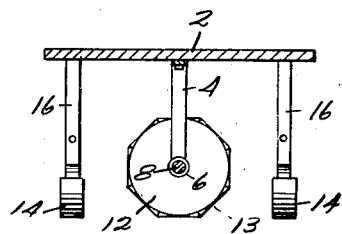
INVENTOR.
John E. Lawson,
BY Victor J. Evans & Co.
ATTORNEYS Patented July 26, 1949

2,476,984

UNITED STATES PATENT OFFICE 2,476,984

TURN-ABOUT COASTER

John E. Lawson, Harbor Creek, Pa.

Application September 17, 1946, Serial No. 697,533

3 Claims. (Cl. 280—21)

My present invention relates to an improved coaster of the type used for coasting on snow or ice and involving a unique combination and arrangement of parts whereby the coaster may be steered during the running of a course, and also turned upon its axis to reverse the direction of the coaster when standing still.

In the accompanying drawings I have illustrated one complete example of the physical embodiment of my invention according to the best mode I have thus far devised but it will be understood that various changes and alterations may be made in the exemplified structure within the scope of the appended claims.

In the drawings:

Figure 1 is a side elevational view of the coaster of my invention.

Figure 2 is a top plan view thereof.

Figure 3 is a front elevational view of the coaster; and

Figure 4 is a transverse vertical sectional view of the coaster showing the rear form of runner.

Referring now to the drawings wherein like characters indicate like parts, I have illustrated the present embodiment of my invention in the coaster comprising a platform 2 upon which the persons riding the coaster may sit, and this platform is mounted upon the braces 4 which are formed with spaced journals 6 for the longitudinal shaft 8.

Upon this shaft 8 and secured for rotation therewith I employ a pair of spaced runners 10 and 12 comprising tapered cylinders with substantially hemi-spherical forward ends. The outer surfaces of these runners are smooth and permit the rapid movement of the coaster over the snow or ice. Intermediate stabilizing runners 14 are secured to the frames 16 attached to the platform and these latter runners maintain the coaster in upright position.

The forward runner 10 is formed with an exterior gear ring 18 engaging a beveled gear 20, and a gear 22 on the shaft 24 above the gear 20, is driven from the gear 26 on the shaft 28. The shaft 28 on its upper end is provided with a crank 30 whereby manual rotation of said shaft is obtained.

The rear runner 12 is similar to the forward runner in its exterior surface however it is longer than the forward runner and smaller in diameter to permit the inclination of the platform 2 as shown in Figure 1. Since the movement of the sled as described is obtained through the rotation of the forward runner the rear runner is a trailer or pivot runner during the rotation of the sled.

As the coaster is gliding on the snow or ice, the craft may be steered by movement of the crank to rotate the two runners on their shaft and rotary movement of the runners will, of course, change the course of the direction of the coaster.

In addition, when the coaster has reached the stopping point and it is desired to return to the starting place, the coaster may be revolved as on a turn table by a continued operation of the crank in either direction whereupon the coaster through the rotation of the rotary runner will revolve about a center just rear of the rear runner and the coaster will be reversed in direction.

On some types of coasting surfaces it may be practical to employ runners having multifaced exterior surfaces as 13 rather than the rounded surfaces described.

The coaster according to my invention will be easy to steer during the running of a course and will due to its construction prove stable in operation. Further the use of the rotary runners will eliminate the pulling of the coaster through a wide arc to reverse its direction or the bodily lifting of the coaster to turn it around.

These and other advantages will be readily apparent to those skilled in the art and require no further description here.

Having thus fully described my invention what I claim as new and desire to secure by Letters Patent is:

1. A coaster comprising a platform and a longitudinal shaft journaled thereunder, spaced runners on the shaft each comprising tapered cylinders having closed rounded forward ends, crank means for rotating the runners, and fixed stabilizing runners.

2. A coaster comprising a platform and a longitudinally extending shaft journaled thereunder, spaced runners on the shaft each comprising conical running surfaces having rounded and closed leading ends, crank means for rotating the runners, and fixed stabilizing runners.

3. A coaster comprising a platform and a longitudinally disposed shaft journaled under the platform, runners secured on the shaft in spaced relation and comprising tapered cylinders having closed rounded forward ends, a gear ring on the forward runner, operating means including a crank in engagement with the gear ring for rotating the runners, and a pair of opposed stabilizing runner shoes intermediate of the platform and supported therefrom.

JOHN E. LAWSON.

REFERENCES CITED

The following references are of record in the file of this patent:

UNITED STATES PATENTS

| Number | Name | Date |
| --- | --- | --- |
| 1,812,252 | Wels | June 30, 1931 |